June 17, 1941.  C. B. BAZZONI ET AL  2,246,460

ELECTRICAL PROSPECTING APPARATUS

Filed Aug. 2, 1938

WITNESS:

INVENTORS
Charles B. Bazzoni
John M. Pearson
BY
ATTORNEYS

Patented June 17, 1941

2,246,460

UNITED STATES PATENT OFFICE 2,246,460

ELECTRICAL PROSPECTING APPARATUS

Charles B. Bazzoni, Wallingford, and John M. Pearson, Swarthmore, Pa., assignors to Sperry-Sun Well Surveying Company, Philadelphia, Pa., a corporation of Delaware Application August 2, 1938, Serial No. 222,608

9 Claims. (Cl. 175—182)

This invention relates to geophysical prospecting, and more particularly, by so-called electrical coring, to the determination of the nature and boundaries of formations traversed by bore holes.

In the patent of Bazzoni and Razek, No. 2,167,630, dated August 1, 1939, there is described a method and apparatus for electrical prospecting involving lowering into a bore hole an apparatus arranged to propagate high frequency oscillations into the strata surrounding the apparatus. By causing the oscillation producing apparatus to be affected by the strata in its vicinity, a measurement of the electrical conditions of the apparatus will give an indication of the formations which are encountered. The various matters to be taken into account in securing results from an apparatus of such type are fully described in said application, and reference may be made thereto for a more general description of the problems which arise.

In an apparatus of the high frequency type just mentioned, and in other electrical coring apparatus using, for example, electrodes carrying direct current or low frequency currents, if power supply or recording apparatus is located in a casing adapted to be lowered through the bore hole, there is involved the difficulty of providing conductors extending from apparatus within a protective casing to radiating means, in the case of high frequency apparatus, or to power or detecting electrodes in low frequency, or direct current apparatus. In deep bore holes which contain mud during the electrical logging procedure there are encountered enormous pressures of such order as to cause failure of any parts insufficiently massive to resist them, and specifically in the case of insulating materials flow thereof to such extent as to produce failure. The provision of electrical leads through the walls of a protective casing is accordingly a major problem in the design of any such apparatus, inasmuch as it is always necessary to insulate one or more of such leads from the protective casing carrying the generating or detecting devices.

It is the principal object of the present invention to provide an insulated packing arrangement for passing electrical currents through a protective casing which is going to be subjected to the enormous pressures existing in deep bore holes. More specifically, the packing is so arranged as to provide for the proper passage of leads for high frequency currents without imparting to the circuit an objectionable degree of inductance where the leads pass through an opening in a steel casing.

It is a further object of the invention to provide an improved exploring coil arrangement for propagating high frequency oscillations in the strata surrounding an apparatus in a bore hole.

The above and more specific objects of the invention will be apparent from the following description, read in conjunction with the accompanying drawing, in which.

Figure 3:
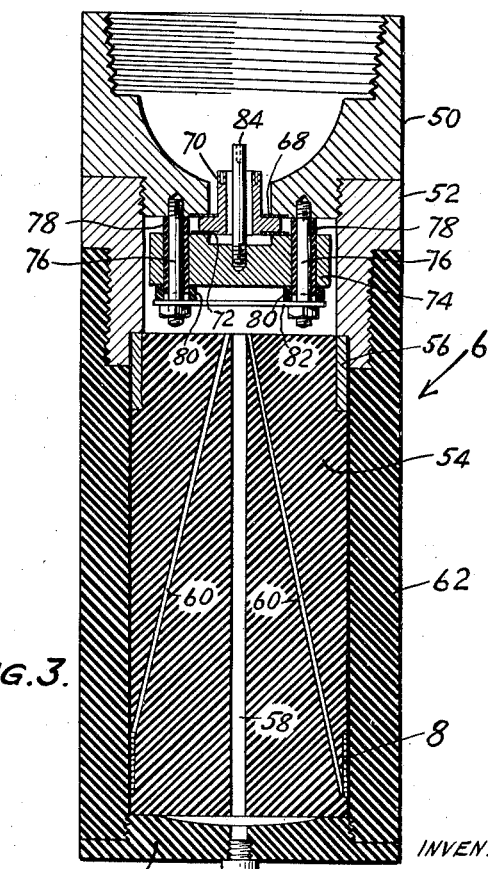
Figure 3 is a longitudinal section through the field producing means and the packing devices providing for the passage of high frequency leads through the protective casing.

The apparatus comprises a protective casing 2 preferably of steel and adapted to withstand the enormous pressures encountered in deep holes. Within this casing there is located interior apparatus indicated at 4 comprising a high frequency oscillator, recording mechanism, and electrical power supplies therefor. At the lower end of the protective casing there is located a nose 6, which is indicated in detail in Figure 3, and which will be hereafter described. This nose 6 embodies a coil 8 providing for the propagation of a high frequency field in the strata surrounding the apparatus.

The upper end of the apparatus is closed by a plug 9 into which extends a cable 10 terminating in a multiple contact socket 12 adapted to be engaged by a multiple contact plug 14 for monitoring and adjusting purposes. The opening through which the plug 14 engages the socket 12 is threaded as indicated at 16 to receive a closure plug before the apparatus is lowered within a well.

Figure 1:
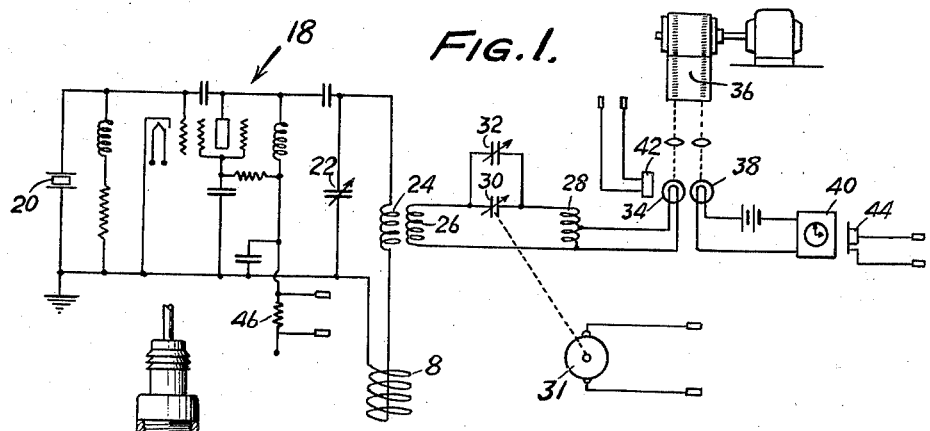
Figure 1 is a wiring diagram showing the oscillation producing and recording apparatus for a logging device of high frequency type.

Within the protective casing there may be included various types of oscillation producing and recording apparatus, of which the apparatus illustrated in Figure 1 is typical. Since the present invention is not concerned with the particular apparatus within the casing, this apparatus will be merely briefly outlined. For details of its construction and operation reference may be made to the application of Bazzoni and Razek, Serial No. 222,609 filed August 2, 1938.

Briefly stated, this apparatus comprises an oscillation generator of vacuum tube type, indicated generally at 18. The oscillator frequency is controlled by a crystal 20 and the oscillator comprises a tank circuit including the exploratory coil 8, an auxiliary coil 24 located within the apparatus and a condenser 22 to form a resonant circuit. Coupled with the coil 24 there is a wave meter circuit comprising two coils 26 and 28 and two condensers 30 and 32 in parallel, the former adapted to be adjusted by means of a motor 31 having leads passing to the socket 12, so that the motor may be operated from the exterior of the apparatus as described in said application. Connected to the wave meter circuit there is a recording lamp 34 adapted to project a spot of light on a continuously moving film 36. A second lamp 38, controlled by a clock 40 is arranged to provide timing marks on the film. Monitoring of the device is accomplished, for example, by means of a photoelectric cell 42 adapted to indicate the illumination of the recording lamp 34, and a microphone 44 adapted to indicate the operation of the timing means and a resistor 46 in the plate supply lead, the voltage drop across which is adapted to indicate the oscillating condition of the generator circuit. These various monitoring devices are connected to the socket 12 so as to be made accessible to outside connections through the medium of the plug 14. After the apparatus is located within the casing and projected into a region containing a conductor to simulate conditions encountered in a bore hole, its proper adjusted condition is determined by the monitoring means and the plug 14 is then removed and the opening 16 closed.

As indicated above, the present invention is concerned primarily with the coil 8 and the arrangement for providing connections thereto from the apparatus inside the casing. For details of this reference may be made to Figure 3.

Figure 2:
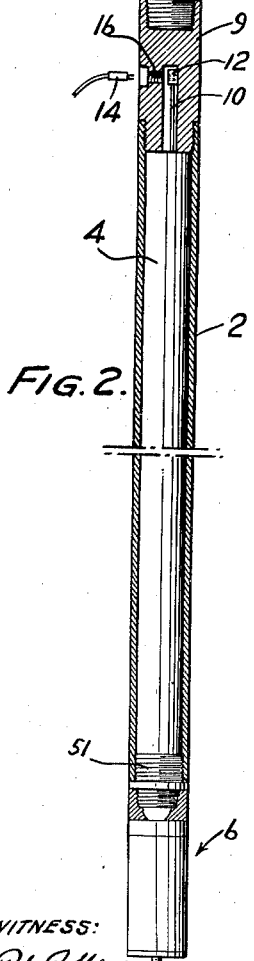
Figure 2 is a sectional view showing the protective casing of the apparatus, the field producing means thereof, and a monitoring and adjusting means.

As illustrated in that figure, the lower end of the protective casing is substantially closed by a cap member 50 threaded upon a nipple 51 (Figure 2) having a central bore for the passage of conducting leads. Threaded on the cap 50 is a coupling member 52, which is provided with a socket adapted to receive the upper end of a cylinder 54 of Bakelite or the like, which upper end is sheathed with a brass or similar metallic ring 56 where it enters the socket in order to prevent cracking in handling. The Bakelite cylinder 54 is provided with a depression adjacent its lower end within which there is wound the single layer coil 8 sufficiently spaced from the ring 56 and coupling member 52 as not to be appreciably short circuited thereby. Openings 60 extending from the upper and lower ends of this coil provide for the passage of the coil leads through the cylinder. The cylinder 54 is also provided with a central bore indicated at 58. The upper end of the cylinder fits within the coupling member 52 closely, but with sufficient clearance to permit the passage of grease for the purpose hereafter described.

Threaded on the coupling member 52 is a Bakelite sleeve 62 adapted to closely surround the cylinder 54 with slight clearance for the passage of grease. The lower end of the sleeve 62 is closed by a cap 64 in an opening of which there is located a high pressure grease connection 66 of the usual type provided with a check valve and used for the lubrication of machinery under high pressure.

The cap 50 has a central opening recessed on its lower side to receive a thin ring 68 of insulating material such as Bakelite. Bearing against this ring is an annular flange of a cylindrical conducting member 70, preferably of brass or similar nonferrous material. The flange in turn is recessed to receive a second annular insulating washer 72 of Bakelite or the like against which there is pressed a yoke member 74, also preferably of brass, which is urged toward the cap 50 by means of stud bolts 76 threaded into the cap and provided with clamping nuts. The bolts 76 are insulated from the yoke 74 by leads 78 of Bakelite or similar material, while interposed between the nuts and the yoke 74 are pressure rings 80, also of insulating material such as Bakelite. A flat member 82 receives both studs and is adapted to act as a lock washer in transmitting pressure through the pressure rings 80 to the yoke 74.

The arrangement just described is adapted to provide a high pressure seal for the opening in the cap 50, and at the same time permit the passage of currents therethrough. By tightening up the nuts on the bolts 76 the various elements just described are clamped against each other, but insulated by means of the washers 68 and 72 and the elements 78 and 80. The strength of Bakelite in compression is so great that an extremely tight joint is possible. Leakage would, of course, tend to occur past 68 and 72 under high pressure, but since these washers may be made very thin leakage will be prevented even though an insulating material such as Bakelite will show some tendency to flow under the enormous pressures which are encountered. As will be pointed out hereafter, the tendency to leakage is also substantially reduced by the filling of the coil chamber by means of a highly viscous grease.

The connections of the coil ends are made to the yoke 74 and the cylinder 70, respectively, by means of set screws (not shown) threaded into these members. A central conducting pin 84 threaded into the yoke 74 and arranged concentrically with the cylinder 70 permits the connections to be carried into the interior of the apparatus. The annular arrangement of 84 and 70 is particularly effective in cutting down the inductance of the leads where they pass through the steel cap 50. This is relatively important because of the use of high frequencies (preferably wave lengths of about 40 meters being used). At the high frequencies the coil 8 can have only relatively few turns and the introduction of substantial inductance in the leads makes it difficult to keep the other inductances sufficiently low to provide the proper resonance condition in the tank circuit.

It is desirable to surround the coil 8 and the various metallic elements providing the connections above indicated by an insulating material. For this purpose, grease is forced under pressure through the check valve connection 66. The connection between the coupling 52 and the cap 50 may be slightly freed to permit the escape of air (or a separate vent may be provided) and viscous grease may be forced into the apparatus until at least the major portion of the air is driven therefrom, and the chamber is filled with grease. Coupling 52 is then tightly secured to the cap 50 and thereafter some further introduction of grease may be effected to build up pressure if desired. By doing this, the grease surrounds the elements 70 and 74 and the gaskets and serves to aid in insulating the conductors from each other against the leakage which might occur if conductive mud were permitted to surround them. Additionally, a zone of insulating material is provided about the coil 8, thus minimizing the short circuiting effects which might occur if conductive mud were permitted to immediately surround the coil. The result is that a greater proportion of the change of impedance of the coil 8 is due to the formations through which the bore hole passes.

After filling the coil chamber with grease the cap 50 may be assembled on the protective casing containing the instruments after the electrical connections are made at 70 and 84. The apparatus may then be monitored, closed up and run in the bore hole in the fashion outlined in said Bazzoni and Razek applications.

While the invention has been particularly designed for the high frequency type of apparatus, it will be obvious that the sealing means which has been described may be equally well used for the passage of other connections through a protective casing as, for example, the leads to current supplying or detecting electrodes in apparatus for logging by the use of direct or low frequency alternating currents. In such cases, the metallic elements would be subjected to a more or less conductive mud, and to avoid partial short circuit they may be painted or coated with a nonconductive material, the connections of the leads thereto being preferably countersink and plugged with insulating material.

What I claim and desire to protect by Letters Patent is:

1. In combination with a protective casing adapted to be lowered into a bore hole and having an opening therein, means for closing said opening against high pressures and for permitting the passage of electrical current comprising an insulating gasket surrounding said opening, a conducting member insulated from the casing by the gasket, a second conducting member, a gasket between the second conducting member and the first conducting member, and means for clamping said conducting members and interposed gaskets to the casing, the conducting members being insulated from each other and from the casing.

2. In combination with a metallic protective casing adapted to be lowered into a bore hole and having an opening therein, means for closing said opening against high pressures and for permitting the passage of electrical current comprising concentrically arranged conducting members insulated from each other and from the casing.

3. In combination with a protective casing adapted to be lowered into a bore hole and having an opening therein, means for closing said opening against high pressures and for permitting the passage of electrical current comprising an annular insulating member surrounding said opening, a conducting member insulated from the casing by said annular insulating member, and means for clamping said conducting member against the insulating member, said clamping means including insulation preventing conduction between the casing and conducting member.

4. In combination with a protective casing adapted to be lowered into a bore hole and having an opening therein, means for closing said opening against high pressures and for permitting the passage of electrical current comprising an annular insulating member surrounding said opening, a conducting member insulated from the casing by said annular insulating member, a second conducting member, insulating means between the second conducting member and the first conducting member, and means for clamping said conducting members and interposed annular insulating member and insulating means to the casing, the conducting members being insulated from each other and from the casing.

5. In combination with a protective casing adapted to be lowered into a bore hole and having an opening therein, means for closing said opening against high pressures and for permitting the passage of electrical current comprising an inner conductor, an outer conductor at least partially surrounding said inner conductor, insulating means for maintaining said conductors in spaced relationship with respect to each other and insulated from the casing, and means for assembling said conductors with the protective casing to provide a fluid-tight closure for said opening.

6. In combination with a protective casing adapted to be lowered into a bore hole and having an opening therein, a coil located outside said opening, an insulating carrier member for said coil, a non-conductive member secured to the casing and providing a chamber outside said opening and containing insulating fluent material, said chamber receiving the coil and its carrier member, and means at least partially within said chamber for closing said opening against high pressure and for permitting the passage of electrical current through the opening.

7. In combination with a protective casing adapted to be lowered into a bore hole and having an opening therein, a coil located outside said opening, an insulating carrier member for said coil, a non-conductive member secured to the casing and providing a chamber outside said opening, said chamber receiving the coil and its carrier member, means for maintaining fluent insulating material within said chamber, and means at least partially within said chamber for closing said opening against high pressure and for permitting the passage of electrical current through the opening.

8. In combination with a protective casing adapted to be lowered into a bore hole and having an opening therein, a coil located outside said opening, an insulating carrier member for said coil, a non-conductive member secured to the casing and providing a chamber outside said opening and containing insulating fluent material, said chamber receiving the coil and its carrier member, and means at least partially within said chamber for closing said opening against high pressure and for permitting the passage of electrical current through the opening, said last means comprising an insulating gasket surrounding the said opening, a conducting member insulated from the casing by the gasket, and means for clamping said member against the gasket, said clamping means providing insulation between the casing and member.

9. In combination with a protective casing adapted to be lowered into a bore hole and having an opening therein, a coil located outside said opening, an insulating carrier member for said coil, a non-conductive member secured to the casing and providing a chamber outside said opening and containing insulating fluent material, said chamber receiving the coil and its carrier member, and means at least partially within said chamber for closing said opening against high pressure and for permitting the passage of electrical current through the opening, said last means comprising an insulating gasket surrounding said opening, a conducting member insulated from the casing by the gasket, a second conducting member, a gasket between the second conducting member and the first conducting member, and means for clamping said conducting members and interposed gaskets in the casing, the conducting members being insulated from each other and from the casing.

CHARLES B. BAZZONI.
JOHN M. PEARSON.